(12) United States Patent
Ku et al.

(10) Patent No.: US 11,450,881 B2
(45) Date of Patent: Sep. 20, 2022

(54) ALL-SOLID SECONDARY BATTERY AND METHOD FOR PREPARING ALL-SOLID SECONDARY BATTERY

(71) Applicants: Samsung Electronics Co., Ltd., Suwon-si (KR); Samsung SDI Co., Ltd., Yongin-si (KR)

(72) Inventors: Junhwan Ku, Seongnam-si (KR); Minsuk Lee, Suwon-si (KR); Hyorang Kang, Anyang-si (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 170 days.

(21) Appl. No.: 16/567,259

(22) Filed: Sep. 11, 2019

(65) Prior Publication Data
US 2020/0136178 A1    Apr. 30, 2020

(30) Foreign Application Priority Data
Oct. 30, 2018  (KR) .................. 10-2018-0131106

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0404* (2013.01); *H01M 10/0525* (2013.01); *H01M 10/0585* (2013.01)

(58) Field of Classification Search
CPC ......... H01M 10/0562; H01M 10/0404; H01M 10/0585; H01M 10/0525; H01M 10/052;
(Continued)

(56) References Cited

U.S. PATENT DOCUMENTS 6,365,300 B1 *  4/2002  Ota ................... H01M 10/0562
                                                429/188
8,221,918 B2 *  7/2012  Katsura ............... H01M 10/052
                                                429/231.8
(Continued)

FOREIGN PATENT DOCUMENTS

JP      2011086554 A  *  4/2011   ........ H01M 10/0562
JP      2012243710 A     12/2012
(Continued)

OTHER PUBLICATIONS

Supplemental machine translation of JP2015195183A with improved legibility and added paragraph numbers (Year: 2015).*
(Continued)

*Primary Examiner* — Allison Bourke
*Assistant Examiner* — Jason Barton
(74) *Attorney, Agent, or Firm* — Cantor Colburn LLP

(57) ABSTRACT

An all-solid secondary battery including: an anode layer including a first anode active material layer; a cathode layer including a cathode active material layer; a solid electrolyte layer between the anode layer and the cathode layer; and an anode current collector on the anode layer and opposite the solid electrolyte layer, wherein a maximum roughness depth $R_{max}$ of a surface of the first anode active material layer is about 3.5 micrometers or less.

17 Claims, 6 Drawing Sheets

(51) Int. Cl.
*H01M 10/0585* (2010.01)
*H01M 10/0525* (2010.01)

(58) Field of Classification Search
CPC ............. H01M 10/058; H01M 4/0435; H01M 4/583; H01M 4/38; H01M 4/13; H01M 2004/021; Y02P 70/50; Y02E 60/10
See application file for complete search history.

(56) References Cited

U.S. PATENT DOCUMENTS

| | | |
|---|---|---|
| 9,954,248 B2 | 4/2018 | Ohtomo et al. |
| 2016/0111755 A1* | 4/2016 | Liu ....................... H01M 10/36 |
| | | 429/152 |
| 2018/0108943 A1* | 4/2018 | Shin .................... H01M 10/056 |

FOREIGN PATENT DOCUMENTS

| | | | | |
|---|---|---|---|---|
| JP | 2014035818 A | * | 2/2014 | ............. Y02E 60/10 |
| JP | 2015195183 A | * | 11/2015 | ............ H01M 4/133 |
| JP | 6172083 A | | 7/2017 | |
| KR | 1020170084450 A | | 7/2017 | |
| WO | WO-2015146315 A1 | * | 10/2015 | ........ H01M 10/0525 |

OTHER PUBLICATIONS

Machine translation of Shigeta (JP2014035818A) (Year: 2014).*
Machine translation of JP-2011086554-A (Year: 2009).*
Machine translation of WO-2015146315-A1 (Year: 2015).*

* cited by examiner

ALL-SOLID SECONDARY BATTERY AND METHOD FOR PREPARING ALL-SOLID SECONDARY BATTERY

CROSS-REFERENCE TO RELATED APPLICATION

This application claims priority to and the benefit of Korean Patent Application No. 10-2018-0131106, filed on Oct. 30, 2018, in the Korean Intellectual Property Office, and all the benefits therefrom under 35 U.S.C. § 119, the content of which is incorporated herein in its entirety by reference.

BACKGROUND

1. Field

The present disclosure relates to an all-solid secondary battery and a method of preparing the same.

2. Description of the Related Art

Recently, batteries having improved energy density and safety have been actively developed. For example, lithium-ion batteries have been put to practical use in the automotive industry as well as in information-related equipment and communication equipment. In the automotive industry safety is important.

Lithium-ion batteries which are currently commercialized use an electrolytic solution containing a flammable organic solvent, and thus there is a possibility of overheating and a fire when a short circuit occurs. As a result, an all-solid battery using a solid electrolyte instead of the electrolytic solution has been proposed.

Since an all-solid battery does not use a flammable organic solvent, even if a short circuit occurs, the possibility of overheating and a fire may be greatly reduced. Therefore, such an all-solid battery may greatly enhance safety as compared with a lithium-ion battery using an electrolytic solution.

However, in the above-mentioned known all-solid battery, since the electrolyte is solid, when contact between a cathode layer and a solid electrolyte and contact between an anode layer and the solid electrolyte are not sufficiently maintained, resistance in the battery is increased, and thus, it is difficult to provide good battery characteristics. Thus there remains a need for improved materials and manufacturing methods.

SUMMARY

Provided are all-solid batteries in which a short circuit is prevented during charge and discharge and cycle characteristics are improved.

Additional aspects will be set forth in part in the description which follows and, in part, will be apparent from the description, or may be learned by practice of the presented embodiments.

According to an aspect of an embodiment, an all-solid secondary battery includes: an anode layer including a first anode active material layer; a cathode layer including a cathode active material layer; a solid electrolyte layer between the anode layer and the cathode layer; and an anode current collector on the anode layer and opposite the solid electrolyte layer, wherein a maximum roughness depth $R_{max}$ of a surface of the first anode active material layer is about 3.5 micrometers or less.

According to an aspect of another embodiment, a method of preparing an all-solid secondary battery includes: preparing a first laminate by placing an anode active material layer on an anode current collector; and preparing an anode layer by pressing the first laminate; preparing a second laminate by placing a solid electrolyte layer on a cathode layer; preparing a third laminate by placing the anode layer on the second laminate such that the solid electrolyte layer and the anode active material layer contact each other; and pressing the third laminate to prepare the all-solid secondary battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
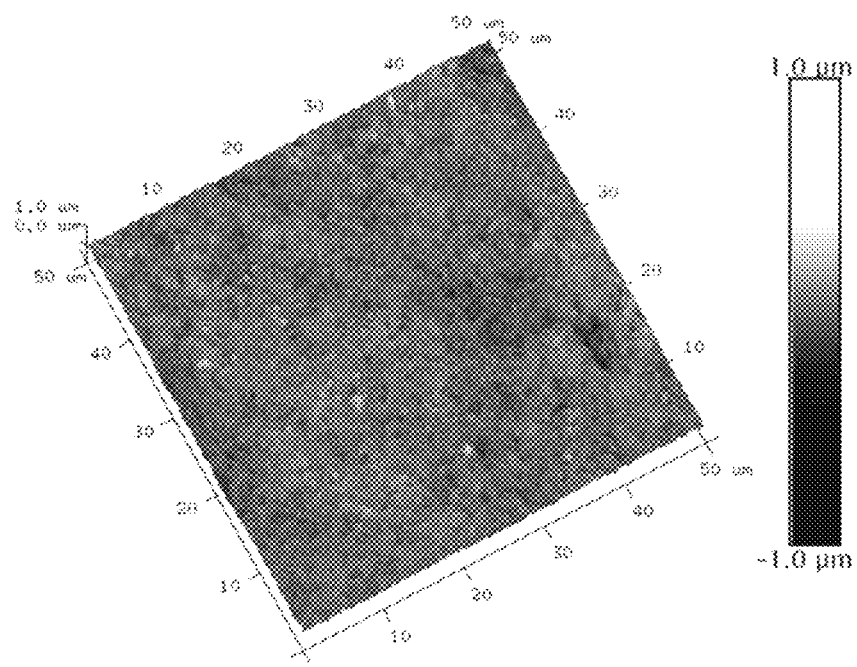
FIG. 1A is an atomic force microscope (AFM) image of a surface of an anode active material layer included in an anode layer prepared in Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

The disclosed aspects will now be described more fully with reference to the accompanying drawings, in which example embodiments are shown. The disclosed aspects may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the disclosed aspects and ways to implement the disclosed aspects to those skilled in the art.

The terminology used herein is for the purpose of describing particular embodiments only and is not intended to be limiting of the disclosed aspects. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

For the purpose of increasing contact between the anode layer and the solid electrolyte, a pressing process is performed in a preparation process of the all-solid battery. While not wanting to be bound by theory, it is understood that in the pressing process, micro-defects are generated at the interface between the anode layer and the solid electrolyte due to the unevenness of the surface of the anode layer. Cracks are generated and grown in the solid electrolyte layer from such defects during charging and discharging of the all-solid battery. Lithium is grown through these cracks, and thus, a short circuit occurs between the cathode layer and the anode layer.

Hereinafter, an all-solid secondary battery and a method for preparing an all-solid secondary battery according to example embodiments will be described in more detail.

An all-solid secondary battery according to an embodiment includes an anode layer including a first anode active material layer; a cathode layer including a cathode active material layer; a solid electrolyte layer between the anode layer and the cathode layer; and an anode current collector on the anode layer and opposite the solid electrolyte layer, wherein a maximum roughness depth $R_{max}$ of the surface of the first anode active material layer is about 3.5 micrometers (μm) or less. Since the surface of the first anode active material layer has a maximum roughness depth $R_{max}$ of about 3.5 μm or less, the cracks on the solid electrolyte layer are suppressed during charge and discharge of the all-solid secondary battery, and thus, a short circuit of an all-solid lithium battery is suppressed. As a result, cycle characteristics of the all-solid secondary battery are improved.

Figure 3:
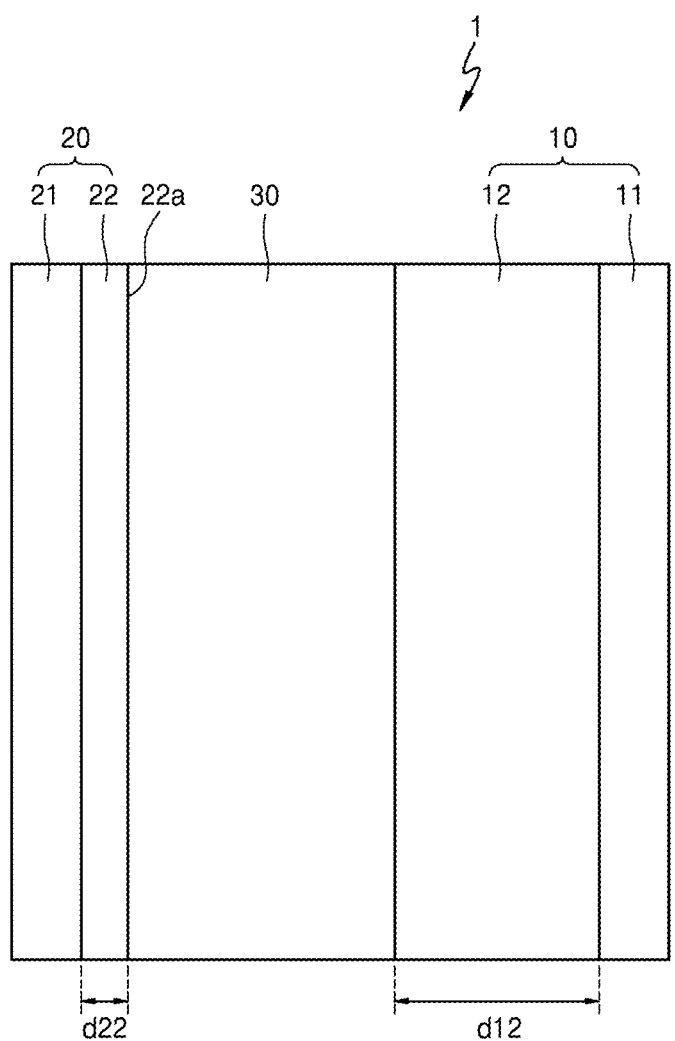
FIG. 3 is a cross-sectional view of an all-solid secondary battery according to an exemplary embodiment.
Figure 4:
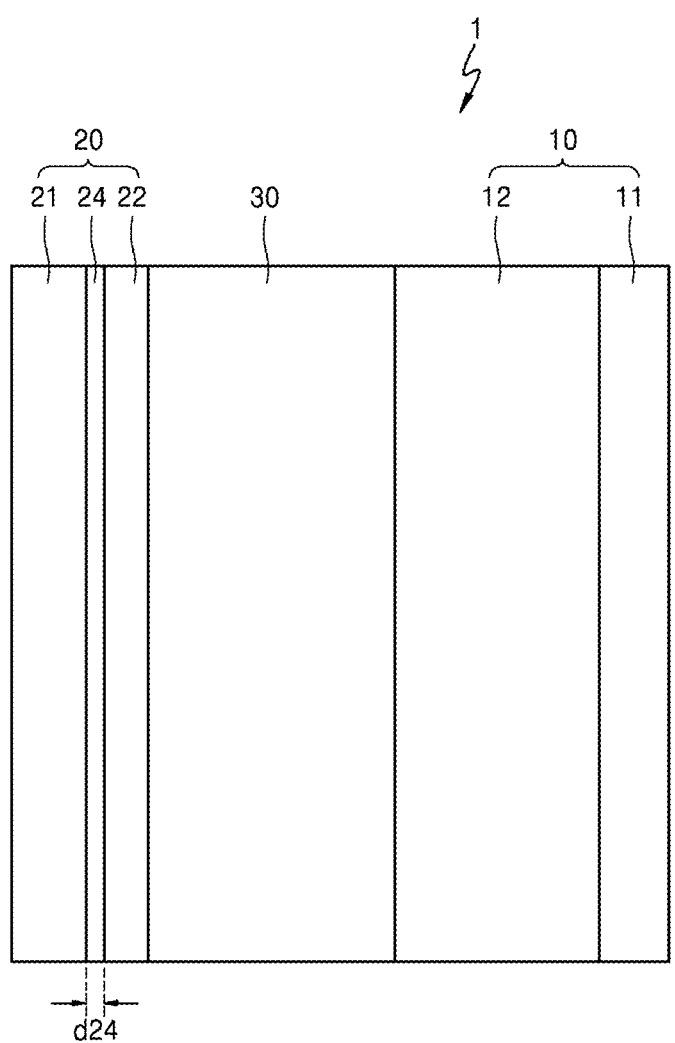
FIG. 4 is a cross-sectional view of an all-solid secondary battery according to an exemplary embodiment.
Figure 5:
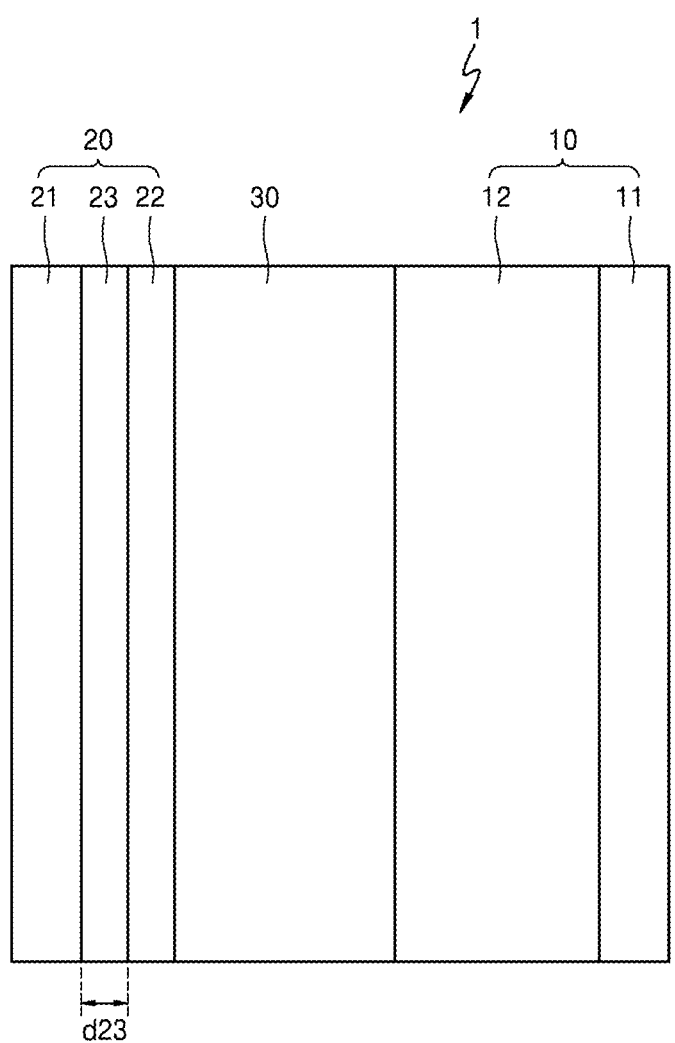
FIG. 5 is a cross-sectional view of an all-solid secondary battery according to an exemplary embodiment.

Referring to FIGS. 3 to 5, an all-solid secondary battery 1 includes an anode layer 20 including a first anode active material layer 22; a cathode layer 10 including a cathode active material layer 12; and a solid electrolyte layer 30 between the anode layer 20 and the cathode layer 10.

Anode Layer

Referring to FIG. 3, the anode layer includes an anode current collector layer 21 and a first anode active material layer 22, and a maximum roughness depth $R_{max}$ of a surface 22a of the first anode active material layer is about 3.5 μm or less. The maximum roughness depth $R_{max}$ of the surface 22a of the first anode active material layer is, for example, about 3 μm or less, about 2.5 μm or less, about 2 μm or less, about 1.5 μm or less, or about 1 μm or less. The maximum roughness depth $R_{max}$ of the surface 22a of the first anode active material layer is, for example, more than 0 to about 3 μm or less, more than 0 to about 2.5 μm or less, more than 0 to about 2 μm or less, more than 0 to about 1.5 μm or less, or about 0.001 μm to about 1 μm or less. The maximum roughness depth $R_{max}$ is a vertical distance between the highest peak and the lowest valley within a length of a sampled roughness profile.

The mean roughness depth $R_a$ of the surface 22a of the first anode active material layer is, for example, about 0.15 μm or less, about 0.1 μm or less, about 0.08 μm or less, 0.07 μm or less, or about 0.06 μm or less. The mean roughness Ra of the surface 22a of the first anode active material layer is, for example, more than 0 to about 0.15 μm or less, more than 0 to about 0.1 μm or less, more than 0 to about 0.08 μm or less, more than 0 to about 0.07 μm or less, or about 0.0001 μm to about 0.06 μm or less. Since the surface 22a of the first anode active material layer has the low mean roughness Ra in such a range, the cracks on the solid electrolyte layer 30 are suppressed during charge and discharge of the all-solid secondary battery 1, and thus, a short circuit of the all-solid lithium battery 1 is suppressed. As a result, cycle characteristics of the all-solid secondary battery 1 are further improved. The mean roughness Ra is an arithmetic mean of an absolute value of an ordinate of a roughness profile.

A root mean square (RMS) roughness Rq of the surface 22a of the first anode active material layer is, for example, about 0.2 µm or less, about 0.15 µm or less, about 0.1 µm or less, about 0.08 µm or less, about 0.07 µm or less, or about 0.06 µm or less. The root mean square (RMS) roughness Rq of the surface 22a of the first anode active material layer is, for example, more than 0 to about 0.2 µm or less, more than 0 to about 0.15 µm or less, more than 0 to 0.1 µm or less, more than 0 to about 0.08 µm or less, more than 0 to about 0.07 µm or less, or about 0.0001 µm to about 0.06 µm or less. Since the surface 22a of the first anode active material layer has the low root mean square (RMS) roughness Rq in such a range, the cracks on the solid electrolyte layer 30 are suppressed during charging and discharging of the all-solid secondary battery 1, and thus, a short circuit of the all-solid lithium battery 1 is suppressed. As a result, cycle characteristics of the all-solid secondary battery 1 are further improved. The root mean square (RMS) roughness Rq is a root mean square of an ordinate of a roughness profile.

A thickness d22 of the first anode active material layer is, for example, about 50% or less, about 40% or less, about 30% or less, about 20% or less, about 10% or less, or 5% or less, e.g., about 1% to about 50%, or about 4% to about 40%, of a thickness d12 of the cathode active material layer. The thickness d22 of the first anode active material layer is, for example, about 1 µm to about 20 µm, about 2 µm to about 10 µm, or about 3 µm to about 7 µm. If the thickness d22 of the first anode active material layer is too small, it is difficult to improve the cycle characteristics of the all-solid secondary battery 1 by disrupting lithium dendrite formed between the first anode active material layer 22 and the anode current collector 21. If the thickness d22 of the first anode active material layer is excessively increased, the energy density of the all-solid secondary battery 1 is lowered and the internal resistance of the all-solid secondary battery 1 is increased by the first anode active material layer 22, and thus it is difficult to improve the cycle characteristics of the all-solid secondary battery 1.

When the thickness d22 of the anode active material layer is decreased, for example, the charging capacity of the first anode active material layer 22 is also decreased. The charging capacity of the first anode active material layer 22 is, for example, about 50% or less, about 40% or less, about 30% or less, about 20% or less, about 10% or less, about 5% or less, or about 2% or less compared with the charging capacity of the cathode active material layer 12. The charging capacity of the first anode active material layer 22 is, for example, about 0.1% to about 50%, about 0.1% to about 40%, about 0.1% to about 30%, about 0.1% to about 20%, about 0.1% to about 10%, about 0.1% to about 5%, or about 0.1% to about 2% compared with the charging capacity of the cathode active material layer 12. If the charging capacity of the first anode active material layer 22 is too small, the thickness of the first anode active material layer 22 is very small, and thus lithium dendrite formed between the first anode active material layer 22 and the cathode active material layer 12 in the repeated charging and discharging process disrupts the first anode active material layer 22, and as a result, it is difficult to improve the cycle characteristics of the all-solid secondary battery 1. If the charging capacity of the first anode active material layer 22 is excessively increased, the energy density of the all-solid secondary battery 1 is lowered and the internal resistance of the all-solid secondary battery 1 is increased by the first anode active material layer 22, and thus it is difficult to improve the cycle characteristics of the all-solid secondary battery 1.

The charging capacity of the cathode active material layer 12 is obtained by multiplying the mass of a cathode active material of the cathode active material layer 12 by a charging capacity density (mAh/g) of the cathode active material. When various kinds of cathode active materials are used, the charging capacity density multiplied by the mass is calculated for each cathode active material, and the sum of these values is the charging capacity of the cathode active material layer 12. The charging capacity of the first anode active material layer 22 is also calculated in the same manner. That is, the charging capacity of the first anode active material layer 22 is obtained by multiplying the mass of the anode active material of the first anode active material layer 22 by the specific charging capacity (mAh/g) of the anode active material. When various kinds of anode active materials are used, charging capacity density multiplied by the mass are calculated for each anode active material, and the sum of these values is the charging capacity of the first anode active material layer 22. Here, the specific charging capacity of the cathode active material and the anode active material is a capacity estimated by using an all-solid half-cell using a lithium metal as a reference electrode. The charging capacities of the cathode active material layer 12 and the first anode active material layer 22 are directly measured by measuring the charging capacity using the all-solid half-cell. The measured charging capacity is divided into the mass of each active material to obtain the specific charging capacity. Alternatively, the charging capacities of the cathode active material layer 12 and the first anode active material layer 22 may be initial charging capacities measured during 1-cycle charging.

The first anode active material layer 22 includes, for example, an anode active material and a binder.

The anode active material included in the first anode active material layer 22 has, for example, a particle shape. An average particle size of the anode active material having the particular shape is, for example, about 4 micrometers (µm) or less, about 3 µm or less, about 2 µm or less, about 1 µm or less, or about 900 nanometers (nm) or less. The average particle size of the anode active material having the particular shape is, for example, about 10 nm to about 4 µm, about 10 nm to about 3 µm, about 10 nm to about 2 µm, about 10 nm to about 1 µm, or about 10 nm to about 900 nm. The anode active material has the average particle size in such a range to further facilitate reversible absorbing and/or desorbing of lithium during charge and discharge. The average particle size of the anode active material is, for example, a median diameter (D50) measured by using a laser type particle size distribution meter.

The anode active material included in the first anode active material layer 22 is, for example, at least one of carbon-based (i.e., carbon-containing) anode active material and metal or metalloid anode active material.

The carbon-based anode active material may comprise an amorphous carbon. The amorphous carbon may be, for example, carbon black (CB), acetylene black (AB), furnace black (FB), ketjen black (KB), graphene, and the like, but is not limited thereto, and any suitable amorphous carbons classified in the art are possible. The amorphous carbon is carbon with no or very low crystallinity, which is distinguished from crystalline carbon or graphite carbon.

The metal or metalloid anode active material may include at least one of gold (Au), platinum (Pt), palladium (Pd), silicon (Si), silver (Ag), aluminum (Al), bismuth (Bi), tin (Sn), and zinc (Zn), but is not limited thereto, and any suitable metal anode active material or metalloid anode active material forming alloys or compounds with lithium in the art are possible. For example, nickel (Ni) is not the metal anode active material because nickel (Ni) does not form an alloy with lithium.

The first anode active material layer 22 includes a kind of anode active material of these anode active materials or includes a mixture of a plurality of different anode active materials. For example, the first anode active material layer 22 may include only amorphous carbon or may include at least one of gold (Au), platinum (Pt), palladium (Pd), silicon (Si), silver (Ag), aluminum (Al), bismuth (Bi), tin (Sn), and zinc (Zn). Alternatively, the first anode active material layer 22 includes a mixture of the amorphous carbon and at least one of gold (Au), platinum (Pt), palladium (Pd), silicon (Si), silver (Ag), aluminum (Al), bismuth (Bi), tin (Sn), and zinc (Zn). A mixing ratio of the mixture of the amorphous carbon and gold or the like is, for example, about 10:1 to about 1:2, about 5:1 to about 1:1, or about 4:1 to about 2:1 as a weight ratio, but is not limited to such a range, and may be selected depending on desired characteristics of the all-solid secondary battery 1. The anode active material has such a composition, and as a result, the cycle characteristics of the all-solid secondary battery 1 are further improved.

The anode active material included in the first anode active material layer 22 includes, for example, a mixture of first particles including amorphous carbons and second particles including metals or metalloids. The metal or metalloid includes, for example, gold (Au), platinum (Pt), palladium (Pd), silicon (Si), silver (Ag), aluminum (Al), bismuth (Bi), tin (Sn), and zinc (Zn). The metalloid is alternatively a semiconductor. The amount of the second particles is about 8 weight percent (wt %) to about 60 wt %, about 10 wt % to about 50 wt %, about 15 wt % to about 40 wt %, or about 20 wt % to about 30 wt % with respect to the total weight of the mixture. The amount of the second particles is in such a range, and as a result, the cycle characteristics of the all-solid secondary battery 1 are further improved.

The first anode active material layer 22 includes, for example, a binder. The binder includes, for example, styrene-butadiene rubber (SBR), polytetrafluoroethylene, polyvinylidene fluoride, polyethylene, a vinylidene fluoride/hexafluoropropylene copolymer, polyacrylonitrile, polymethyl methacrylate, and the like, but is not limited thereto and any suitable binders used in the art is possible. The binder may be configured as a single binder or a plurality of different binders.

The first anode active material layer 22 includes the binder to be stabilized on the anode current collector 21. Further, the cracks of the first anode active material layer 22 are suppressed despite the volume change and/or the relative position change of the first anode active material layer 22 during the charge and discharge process. For example, in the case where the first anode active material layer 22 does not include the binder, the first anode active material layer 22 may be easily separated from the anode current collector 21. A portion of the anode current collector 21, from which the first anode active material layer 22 separated, can contact the solid electrolyte layer 30 by exposing the anode current collector 21, and thus the possibility to generate the short circuit increases. The first anode active material layer 22 may be prepared by coating and drying on the anode current collector 21 a slurry in which a material constituting the first anode active material layer 22 is dispersed. The binder is included in the first anode active material layer 22, so that the stable dispersion of the anode active material in the slurry is possible. For example, when the slurry is coated on the anode current collector 2 by a screen printing method, it is possible to suppress clogging of the screen (for example, clogging of the aggregate of the anode active material).

The anode current collector 21 includes, for example, a material which does not react with lithium, that is, does not form both an alloy and a compound. The material forming the anode current collector 21 may be, for example, copper (Cu), stainless steel, titanium (Ti), iron (Fe), cobalt (Co), and nickel (Ni), but is not limited thereto, and any suitable material used as the electrode current collector in the art are possible. The anode current collector 21 may include a single kind of the above-described metals, or an alloy, or a coating material of two or more kinds of metals. The anode current collector 21 may have, for example, a plate shape or a foil shape.

The first anode active material layer 22 may further include additives such as a filler, a dispersant, a conductive agent, a binder, and the like, which are used in the existing all-solid secondary battery 1.

Referring to FIG. 4, the all-solid secondary battery 1 further includes, for example, a thin film 24 including elements capable of forming an alloy with lithium on the anode current collector 21. The thin film 24 is placed between the anode current collector 21 and the first anode active material layer 22. The thin film 24 includes, for example, an element capable of forming an alloy with lithium. Examples of the element capable of forming the alloy with lithium include gold, silver, zinc, tin, indium, silicon, aluminum, bismuth and the like, but are not limited thereto, and any suitable element capable of forming the alloy with lithium in the art are possible. The thin film 24 may include one of these metals or include an alloy of several kinds of metals. The thin film 24 is placed on the anode current collector 21 to further planarize a precipitation form of, for example, a second anode active material layer (not shown) precipitated between the thin film 24 and the first anode active material layer 22 and further improve the cycle characteristics of the all-solid secondary battery 1.

A thickness d24 of the thin film is, for example, about 1 nm to about 800 nm, about 10 nm to about 700 nm, about 50 nm to about 600 nm, or about 100 nm to about 500 nm. When the thickness d24 of the thin film is less than 1 nm, it may be difficult to exhibit the function of the thin film 24. When the thickness d24 of the thin film is too large, the thin film 24 itself absorbs lithium, and as a result, the precipitation amount of lithium is decreased in an anode, the energy density of the all-solid battery is deteriorated, and the cycle characteristics of the all-solid secondary battery 1 may be deteriorated. The thin film 24 may be placed on the anode current collector 21 by, for example, a vacuum deposition method, a sputtering method, a plating method, and the like, but the method is not limited thereto and any suitable method capable of forming the thin film 24 in the art are possible.

Referring to FIG. 5, the all-solid secondary battery 1 further includes, for example, a second anode active material layer 23 between the anode current collector 21 and the first anode active material layer 22 by charging. Although not shown in the drawing, the all-solid secondary battery 1 further includes a second anode active material layer 23 between the solid electrolyte layer 30 and the first anode active material layer 22 by charging or may include a single configuration. The second anode active material layer 23 is a metal layer including lithium or a lithium alloy. The metal layer includes lithium or a lithium alloy. Accordingly, the second anode active material layer 23 is a metal layer including lithium to serve as, for example, a lithium reservoir. The lithium alloy includes, for example, a Li—Al alloy, a Li—Sn alloy, a Li—In alloy, a Li—Ag alloy, a Li—Au alloy, a Li—Zn alloy, a Li—Ge alloy, a Li—Si alloy, or the like, but is not limited thereto and any suitable alloys used as the lithium alloy in the art are possible. The second anode active material layer 23 may include one of these alloys or lithium or include various kinds of alloys.

A thickness d23 of the second anode active material layer is not limited, but is, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness d23 of the second anode active material layer is too small, it is difficult to serve as a lithium reservoir by the second anode active material layer 23. When the thickness d23 of the second anode active material layer is too large, the mass and the volume of the all-solid secondary battery 1 are increased and there is a possibility that the cycle characteristics may be still deteriorated. The second anode active material layer 23 may be, for example, a metal foil having the thickness in such a range.

In the all-solid secondary battery 1, the second anode active material layer 23 may be placed between the anode current collector 21 and the first anode active material layer 22 before assembling the all-solid secondary battery 1 or precipitated between the anode current collector 21 and the first anode active material layer 22 by charging after assembling the all-solid secondary battery 1.

When the second anode active material layer 23 is placed between the anode current collector 21 and the first anode active material layer 22 before assembling the all-solid secondary battery 1, the second anode active material layer 23 is a metal layer including lithium to serve as a lithium reservoir. The cycle characteristics of the all-solid secondary battery 1 including the second anode active material layer 23 are further improved. For example, the lithium foil is placed between the anode current collector 21 and the first anode active material layer 22 before assembling the all-solid secondary battery 1.

When the second anode active material layer 23 is placed by charging after assembling the all-solid secondary battery 1, the second anode active material layer 23 is not included when assembling the all-solid secondary battery 1, the energy density of the all-solid secondary battery 1 is increased. For example, when the all-solid secondary battery 1 is charged, the charging capacity of the first anode active material layer 22 is exceeded. That is, the first anode active material layer 22 is overcharged. In the initial charging, lithium is absorbed in the first anode active material layer 22. That is, the anode active material included in the first anode active material layer 22 forms an alloy or a compound with lithium ions which have moved from the cathode layer 10. When the first anode active material layer 22 is charged by exceeding the capacity, for example, lithium is precipitated between the rear surface of the first anode active material layer 22, that is, the anode current collector 21 and the first anode active material layer 22, and the metal layer corresponding to the second anode active material layer 23 is formed by the precipitated lithium. The second anode active material layer 23 is a metal layer mainly including lithium (that is, lithium metal). The anode active material included in the first anode active material layer 22 includes a material forming an alloy or a compound with lithium to obtain such a result. During discharge, lithium of the first anode active material layer 22 and the second anode active material layer 23, that is, the metal layer is ionized to move toward the cathode layer 10. Accordingly, lithium may be used as the anode active material in the all-solid secondary battery 1. In addition, since the first anode active material layer 22 covers the second anode active material layer 23, the first anode active material layer 22 serves as a protective layer of the second anode active material layer 23, that is, the metal layer and serves to suppress the precipitation growth of lithium dendrite. Accordingly, it is possible to suppress the short circuit and the capacity decrease of the all-solid secondary battery 1, thereby improving the cycle characteristics of the all-solid secondary battery 1. Further, when the second anode active material layer 23 is placed by charging after assembling the all-solid secondary battery 1, the anode current collector 21, the first anode active material layer 22, and an area therebetween are, for example, Li-free areas not including lithium (Li) in an initial state or a state after discharging of the all-solid secondary battery.

Solid Electrolyte Layer

Referring to FIGS. 3 to 5, the solid electrolyte layer 30 includes a solid electrolyte between the cathode layer 10 and the anode layer 20.

The solid electrolyte layer may include, for example, a sulfide-based solid electrolyte. The sulfide-based solid electrolyte is at least one of, for example, $Li_2S$—$P_2S_5$, $Li_2S$—$P_2S_5$—LiX wherein X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$-ZmSn wherein m and n are positive numbers, Z is one of Ge, Zn or Ga, $Li_2S$—$GeS_2$, $Li_2S$—$SiS_2$—$Li_3PO_4$, $Li_2S$—$SiS_2$-$Li_pMO_q$ wherein p and q are positive numbers, M is one of P, Si, Ge, B, Al, Ga In, $Li_{7-x}PS_{6-x}Cl_x$ wherein $0≤x≤2$, $Li_{7-x}PS_{6-x}Br_x$ wherein $0≤x≤2$, and $Li_{7-x}PS_{6-x}I_x$ wherein $0≤x≤2$. The sulfide-based solid electrolyte is prepared, for example, by treating a starting material such as $Li_2S$ and $P_2S_5$ by a melt-quenching method, a mechanical milling method, or the like. Further, after such treatment, a heat treatment may be performed. The solid electrolyte may be amorphous, crystalline, or a mixed state thereof.

In addition, the solid electrolyte layer may include, for example, sulfur (S), phosphorus (P), and lithium (Li) as at least a constituent element of the above-described sulfide-based solid electrolyte material. For example, the solid electrolyte may be a material containing $Li_2S$—$P_2S_5$. When a material containing $Li_2S$—$P_2S_5$ is used as the sulfide-based solid electrolyte material for forming the solid electrolyte, a mixed molar ratio of $Li_2S$ and $P_2S_5$ is in a range of, for example, $Li_2S:P_2S_5$=about 50:50 to about 90:10.

The sulfide-based solid electrolyte included in the solid electrolyte layer may be an argyrodite-type compound including at least one of $Li_{7-x}PS_{6-x}Cl_x$ wherein $0≤x≤2$, $Li_{7-x}PS_{6-x}Br_x$ wherein $0≤x≤2$, and $Li_{7-x}PS_{6-x}I_x$ wherein $0≤x≤2$. The sulfide-based solid electrolyte included in the solid electrolyte layer may be an argyrodite-type compound including at least one of $Li_6PS_5Cl$, $Li_6PS_5Br$, and $Li_6PS_5I$.

The solid electrolyte layer 30 may further include, for example, a binder. The binder included in the solid electrolyte layer 30 may be selected from, for example, styrene butadiene rubber (SBR), polytetrafluoroethylene, polyvinylidene fluoride, polyethylene, and the like, but is not limited thereto and all binders used as the binder in the art are possible. The binder of the solid electrolyte layer 30 may be the same as or different from the binders of the cathode active material layer 12 and the anode active material layer 22.

Cathode Layer

The cathode layer 10 includes a cathode current collector 11 and a cathode active material layer 12.

The cathode current collector 11 uses a plate, a foil, or the like including, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or alloys thereof. The cathode current collector 11 may be omitted.

The cathode active material layer 12 includes, for example, a cathode active material and a solid electrolyte. The solid electrolyte included in the cathode layer 10 is similar to or different from the solid electrolyte included in the solid electrolyte layer 30. The detailed contents of the solid electrolyte refer to the solid electrolyte layer 30 portion.

The cathode active material is a cathode active material capable of reversibly absorbing and desorbing lithium ions. The cathode active material includes, for example, a lithium transition metal oxide such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, and lithium iron phosphate, nickel sulfide, copper sulfide, lithium sulfide, iron oxide, or vanadium oxide, but is not limited thereto, and any suitable cathode active materials used in the art are possible. The cathode active material may be either a single material or a mixture of two or more materials.

The lithium transition metal oxide is, for example, a compound represented by any one of Chemical Formulas of $Li_aA_{1-b}B'_bD_2$ (wherein, $0.90 \leq a \leq 1$, and $0 \leq b \leq 0.5$); $Li_aE_{1-b}B'_bO_{2-c}D_c$ (wherein, $0.90 \leq a \leq 1$, $0 \leq b \leq 0.5$, $0 \leq c \leq 0.05$); $LiE_{2-b}B'_bO_{4-c}D_c$ (wherein, $0 \leq b \leq 0.5$, $0 \leq c \leq 0.05$); $Li_aNi_{1-b-c}Co_bB'_cD_\alpha$ (wherein, $0.90 \leq a \leq 1$, $0 \leq b \leq 0.5$, $0 \leq c \leq 0.05$, $0 < \alpha \leq 2$); $Li_aNi_{1-b-c}Co_bB'_cO_{2-\alpha}F'_\alpha$ (wherein, $0.90 \leq a \leq 1$, $0 \leq b \leq 0.5$, $0 \leq c \leq 0.05$, $0 < \alpha \leq 2$); $Li_aNi_{1-b-c}Mn_bB'_cD_\alpha$ (wherein, $0.90 \leq a \leq 1$, $0 \leq b \leq 0.5$, $0 \leq c \leq 0.05$, $0 < \alpha \leq 2$); $Li_aNi_{1-b-c}Mn_bB'_cO_{2-\alpha}F'_\alpha$ (wherein, $0.90 \leq a \leq 1$, $0 \leq b \leq 0.5$, $0 \leq c \leq 0.05$, $0 < \alpha \leq 2$); $Li_aNi_bE_cG_dO_2$ (wherein, $0.90 \leq a \leq 1$, $0 \leq b \leq 0.9$, $0 \leq c \leq 0.5$, $0.001 \leq d \leq 0.1$); $Li_aNi_bCo_cMn_dGeO_2$ (wherein, $0.90 \leq a \leq 1$, $0 \leq b \leq 0.9$, $0 \leq c \leq 0.5$, $0 \leq d \leq 0.5$, $0.001 \leq e \leq 0.1$); $Li_aNiG_bO_2$ (wherein, $0.90 \leq a \leq 1$, $0.001 \leq b \leq 0.1$); $Li_aCoG_bO_2$ (wherein, $0.90 \leq a \leq 1$, $0.001 \leq b \leq 0.1$); $Li_aMnG_bO_2$ (wherein, $0.90 \leq a \leq 1$, $0.001 \leq b \leq 0.1$); $Li_aMn_2G_bO_4$ (wherein, $0.90 \leq a \leq 1$, $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$. In these compounds, A is Ni, Co, Mn, or a combination thereof; B' is Al, Ni, Co, Mn, Cr, Fe, Mg, Sr, V, a rare earth element or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. It is possible to use a compound of which a coating layer is added on the surface of such a compound, and also to use a mixture of the above-described compound and the compound to which the coating layer is added. The coating layer added to the surface of the compound includes, for example, oxide of a coating element, hydroxide of a coating element, oxyhydroxide of a coating element, oxycarbonate of a coating element, or a hydroxycarbonate of a coating element. The compound forming the coating layer is amorphous or crystalline. The coating element included in the coating layer is Mg, Al, Co, K, Na, Ca, Si, Ti, V, Sn, Ge, Ga, B, As, Zr or a mixture thereof. A method of forming the coating layer is selected within a range that does not adversely affect the physical properties of the cathode active material. The coating method includes, for example, spray coating, immersing, and the like. The specific coating method is well understood by those skilled in the art, so a detailed description thereof will be omitted.

The cathode active material includes, for example, a lithium salt of a transition metal oxide having a layered rock salt type structure among the above-described lithium transition metal oxides. The "layered rock salt type structure" is a structure in which an oxygen atom layer and a metal atom layer are regularly arranged in a <111> direction of a cubic rock salt type structure and each atom layer forms a two-dimensional plane. The "cubic rock salt type structure" represents a NaCl type structure which is a kind of crystal structure, and specifically, represents a structure in which face centered cubic lattices (fcc) formed by a cation and an anion are misaligned to each other by ½ of the ridge of a unit lattice. The lithium transition metal oxide having such a layered rock salt type structure is a ternary lithium transition metal oxide such as $LiNi_xCo_yAl_zO_2$ (NCA) or $LiNi_xCo_yMn_zO_2$ (NCM) ($0 < x < 1$, $0 < y < 1$, $0 < z < 1$, $x+y+z=1$). When the cathode active material includes the ternary lithium transition metal oxide having the layered rock salt type structure, the energy density and thermal stability of the all-solid secondary battery 1 are further improved.

The cathode active material may be covered with the coating layer as described above. The coating layer may be any coating layer which is known as the coating layer of the cathode active material of the all-solid secondary battery. The coating layer is, for example, $Li_2O$—$ZrO_2$ or the like.

When the cathode active material includes nickel (Ni) as a ternary lithium transition metal oxide such as NCA or NCM, the capacity density of the all-solid secondary battery 1 is increased to reduce the metal elution of the cathode active material in a charged state. As a result, cycle characteristics in the charged state of the all-solid secondary battery 1 are improved.

The shape of the cathode active material is, for example, a particle shape such as a sphere or an elliptical sphere. The particle size of the cathode active material is not limited and in a range applicable to the cathode active material of the existing all-solid secondary battery. The amount of the cathode active material of the cathode layer 10 is not limited thereto and in a range applicable to the cathode layer of the existing all-solid secondary battery.

The cathode layer 10 may further include an additives such as a conductive agent, a binder, a filler, a dispersant, and an ion conductive auxiliary agent in addition to the cathode active material and the solid electrolyte described above. Such a conductive agent includes, for example, graphite, carbon black, acetylene black, Ketjen black, carbon fiber, metal powder and the like. The binder includes, for example, styrene butadiene rubber (SBR), polytetrafluoroethylene, polyvinylidene fluoride, polyethylene, and the like. As a filler, a dispersant, an ion conductive auxiliary agent and the like may be mixed to provide the cathode layer 10.

A method for preparing an all-solid secondary battery according to another embodiment includes preparing a first laminate by placing an anode active material layer on an anode current collector; and preparing an anode layer by pressing the first laminate. The maximum roughness of the surface 22a of the anode active material layer is reduced by pressing the first laminate so as to suppress a short circuit of the all-solid secondary battery 1 and improve the cycle characteristics of the all-solid secondary battery 1.

The all-solid secondary battery 1 is preparing by, for example, preparing the cathode layer 10, the anode layer 20 and the solid electrolyte layer 30, respectively, and then laminating these layers.

Preparation of Electrode

A slurry is prepared by adding an anode active material, a binder, and the like as materials constituting the first anode active material layer 22 to a polar solvent or a non-polar solvent. The prepared slurry is coated and dried on the anode current collector 21 to prepare the first laminate. Subsequently, the dried laminate is pressed to prepare the anode layer 20. The pressing may be, for example, by roll pressing, flat pressing, or the like, but is not limited thereto, and any suitable method of pressing used in the art is possible. The pressure applied during the pressing is, for example, about 50 megaPascals (MPa) to about 500 MPa. The time when the pressure is applied is about 5 milliseconds (ms) to about 1 minute (min). The pressing is performed, for example, at a temperature of 20° C. to 90° C. or less, a temperature of about 20° C. to about 90° C. Alternatively, the pressing is performed at a high temperature of about 100° C. or more, e.g., about 100° C. to about 200° C. A maximum roughness depth $R_{max}$ of the surface 22a of the first anode active material layer included in the anode layer 20 obtained by pressing the first laminate is 3.5 μm or less.

Preparation of Cathode Layer

A slurry is prepared by adding a cathode active material, a binder, and the like constituting the cathode active material layer 12 to a non-polar solvent. The prepared slurry is coated and dried on the cathode current collector 11. The cathode layer 10 is prepared by pressing the obtained laminate. The pressing may be, for example, by roll pressing, flat pressing, pressing using a hydrostatic pressure, or the like, but is not limited thereto, and any suitable method of pressing used in the art is possible. The pressing process may be omitted. A mixture of materials constituting the cathode active material layer 12 is compacted in a pellet form or stretched (molded) in a sheet form to prepare the cathode layer 10. When the cathode layer 10 is prepared by such a method, the cathode current collector 11 may be omitted.

Preparation of Solid Electrolyte Layer

The solid electrolyte layer 30 is prepared by, for example, a solid electrolyte including a sulfide-based solid electrolyte material.

The sulfide-based solid electrolyte is subjected to treating a starting material by, for example, a melt-quenching method, a mechanical milling method, or the like, but the present disclosure is not limited to these methods, and any suitable preparing method of the sulfide-based solid electrolyte used in the art is possible. For example, when the melt-quenching method is used, a small amount of starting material such as $Li_2S$ and $P_2S_5$ is mixed to form a pellet shape, and then reacted in a vacuum at a predetermined reaction temperature, and quenched to prepare a sulfide-based solid electrolyte material. Further, the reaction temperature of the mixture of $Li_2S$ and $P_2S_5$ is, for example, about 400° C. to about 1000° C., or about 800° C. to about 900° C. The reaction time is, for example, about 0.1 hour to about 12 hours, or about 1 hour to about 12 hours. The quenching temperature of the reactant is 10° C. or less, or 0° C. or less, and the quenching rate is about 1° C./sec to about 10000° C./sec, or about 1° C./sec to about 1000° C./sec. For example, when mechanical milling is used, the sulfide-based solid electrolyte material is prepared by stirring and reacting starting materials such as $Li_2S$ and $P_2S_5$ using a ball mill or the like. Although the stirring speed and stirring time of the mechanical milling method are not limited, the faster the stirring speed, the faster the production rate of the sulfide-based solid electrolyte material becomes, and the longer the stirring time, the higher the conversion rate of the raw material into the sulfide-based solid electrolyte material becomes. Subsequently, the mixed raw material obtained by the melt-quenching method, the mechanical milling method or the like is heat-treated at a predetermined temperature and then pulverized to prepare a particle-shaped solid electrolyte. When the solid electrolyte has a glass transition property, the solid electrolyte may be transformed from amorphous to crystalline by heat treatment.

The solid electrolyte obtained in such a method is deposited by using a known film forming method such as an aerosol deposition method, a cold spray method, a sputtering method or the like to prepare the solid electrolyte layer 30. Alternatively, the solid electrolyte layer 30 may be prepared by pressing a single solid electrolyte particle. Alternatively, the solid electrolyte layer 30 may be prepared by mixing and applying the solid electrolyte, the solvent, and the binder, and drying and pressing the mixture.

Preparation of all-Solid Second Battery

The cathode layer 10, the anode layer 20 and the solid electrolyte layer 30 prepared by the above-described method are laminated and pressed so that the solid electrolyte layer 30 is placed between the cathode layer 10 and the anode layer 20 to prepare the all-solid secondary battery 1.

For example, the solid electrolyte layer 30 is placed on the cathode layer 10 to prepare a second laminate. Subsequently, the anode layer 20 is placed on the second laminate so as to contact the solid electrolyte layer 30 and the first anode active material layer to prepare a third laminate and the all-solid secondary battery 1 is prepared by pressing the third laminate. The pressing may be, for example, by roll pressing, flat pressing, pressing using a hydrostatic pressure, or the like, but is not limited thereto, and any suitable method of pressing used in the art is possible. The pressure applied during pressing is, for example, about 50 MPa to about 750 MPa. The time when the pressure is applied is about 5 ms to about 5 min. The pressing is performed, for example, at a temperature of room temperature to 90° C. or less, a temperature of about 20° C. to about 90° C. Alternatively, the pressing is performed at a high temperature of 100° C. or more. By this pressing, for example, the solid electrolyte powder is sintered to form one solid electrolyte layer.

The configuration and the manufacturing method of the all-solid secondary battery 1 described above are examples of the embodiments, and the constituent members, the manufacturing procedure and the like may be appropriately changed.

The disclosed aspects will be described in more detail through the following Examples and Comparative Examples. However, the embodiment is intended to illustrate the disclosed aspects, and the scope of the inventive idea is shall not be limited by these Examples.

EXAMPLES

Example 1: Roll Press

Preparation of Anode Layer

A Ni foil having a thickness of 10 μm was prepared as an anode current collector. Further, furnace black (FB-C) having a primary particle size of about 76 nm and silver (Ag) particles having an average particle diameter of about 800 nm were prepared as an anode active material.

Mixed powder obtained by mixing the furnace black (FB-C) and the silver particles at a weight ratio of 3:1 was used in an anode. 4 grams (g) of the mixed powder was put in a container and 4 g of an NMP solution containing 5 wt % of a PVDF binder (#9300 from Kureha Co., Ltd.) was added thereto to prepare a mixed solution. Subsequently, the mixed solution was stirred while NMP was gradually added to the mixed solution to prepare slurry. The NMP was added until the viscosity of the slurry became suitable for film formation by a blade coater. The prepared slurry was applied to a Ni foil using a blade coater and dried in air at 80° C. for 20 minutes. The laminate obtained above was vacuum-dried at 100° C. for 12 hours. The dried laminate was roll-pressed at room temperature and a pressure of 300 MPa for 10 ms (millisecond) to planarize the surface of a first anode active material layer of the laminate. An anode layer was prepared by the above-described process. The thickness of the first anode active material layer included in the anode layer was about 5 μm.

Preparation of Cathode Layer $LiNi_{0.8}Co_{0.15}Mn_{0.05}O_2$ (NCM) was prepared as a cathode active material. $Li_6PS_5Cl$ which was an argyrodite type crystal was prepared as a solid electrolyte. As the binder, a polytetrafluoroethylene (PTFE) binder (Teflon binder made by DuPont) was prepared. Carbon nanofiber (CNF) was prepared as a conductive agent. These materials were mixed at a weight ratio of cathode active material:hybrid electrolyte:conductive agent:binder=88.5:8:2:1.5, and the mixture was molded into a sheet form to prepare a cathode sheet. The prepared cathode sheet was pressed on both sides of a cathode current collector including a carbon-coated aluminum foil having a thickness of 18 μm to prepare a cathode layer. The thickness of the cathode active material layer included in the cathode layer was about 100 μm.

Preparation of Solid Electrolyte Layer part by weight of a styrene-butadiene rubber (SBR) binder was added to a $Li_6PS_5Cl$ solid electrolyte with respect to 100 parts by weight of the solid electrolyte to prepare a mixture. Slurry was prepared by adding xylene and diethylbenzene to the prepared mixture while stirring. The prepared slurry was applied to a nonwoven fabric using a blade coater and dried at 40° C. in air to obtain a laminate. The obtained laminate was vacuum-dried at 40° C. for 12 hours. A solid electrolyte layer was prepared by the above process.

Preparation of all-Solid Second Battery

Solid electrolyte layers were placed on both surfaces of a cathode layer, respectively, and anode layers were placed on the solid electrolyte layers so that an anode active material layer contacted the solid electrolyte layers, respectively, to prepare a laminate. The prepared laminate was plate-pressed at room temperature and a pressure of 500 MPa for 1 min. By this pressing, the solid electrolyte layer was sintered to improve battery characteristics.

Example 2: Flat Press

An all-solid lithium battery was prepared in the same manner as Example 1 except that the surface of the anode active material layer of the laminate was planarized by flat press at the same pressure instead of roll press during the preparation of the anode layer.

Example 3: Introduction of Sn Thin Film

A Ni foil having a thickness of 10 μm was prepared as an anode current collector. A tin (Sn) plating layer having a thickness of 500 nm was formed on the Ni foil. An all-solid lithium battery was prepared in the same manner as Example 1 except that the Ni foil formed with the Sn thin film was used as the anode current collector.

Example 4: FB Alone

An all-solid lithium battery was prepared in the same manner as Example 1 except for using furnace black (FB-C) alone instead of a 3:1 mixture of furnace black (FB-C) having a primary particle size of about 76 nm and silver (Ag) particles having an average particle diameter of about 800 nm as an anode active material.

Example 5: Si Alone

An all-solid lithium battery was prepared in the same manner as Example 1 except for using silicon (Si) particles having an average particle size of 100 nm instead of a 3:1 mixture of furnace black (FB-C) having a primary particle size of about 76 nm and silver (Ag) particles having an average particle diameter of about 800 nm as an anode active material.

Comparative Example 1: No Press

An all-solid lithium battery was prepared in the same manner as Example 1 except for using a dried laminate as it is as an anode layer by omitting a pressing step during the preparation of the anode layer.

Comparative Example 2: No First Anode Active Material Layer

An all-solid lithium battery was prepared in the same manner as Example 1 except for using only a Ni anode current collection without forming a first anode active material layer.

Comparative Example 3: Ni Alone

An all-solid lithium battery was prepared in the same manner as Example 1 except for using nickel (Ni) particles having an average particle size of 100 nm instead of a 3:1 mixture of furnace black (FB-C) having a primary particle size of about 76 nm and silver (Ag) particles having an average particle diameter of about 800 nm.

Comparative Example 4: Graphite Alone

An all-solid lithium battery was prepared in the same manner as Example 1 except for using scale-shaped graphite particles having an average particle size of 5 μm instead of a 3:1 mixture of furnace black (FB-C) having a primary particle size of about 76 nm and silver (Ag) particles having an average particle diameter of about 800 nm as an anode active material.

Evaluation Example 1: Evaluation of Surface Roughness

The surface roughness of the anode active material layers included in the anode layers prepared in Examples 1 and 2 and Comparative Example 1 was evaluated using an atomic force microscopy (AFM).

The evaluated results were shown in FIGS. 1A to 1C and Table 1 below.

FIG. 1A is an image of the surface of the anode active material layer planarized by the roll press prepared in Example 1.

Figure 1B:
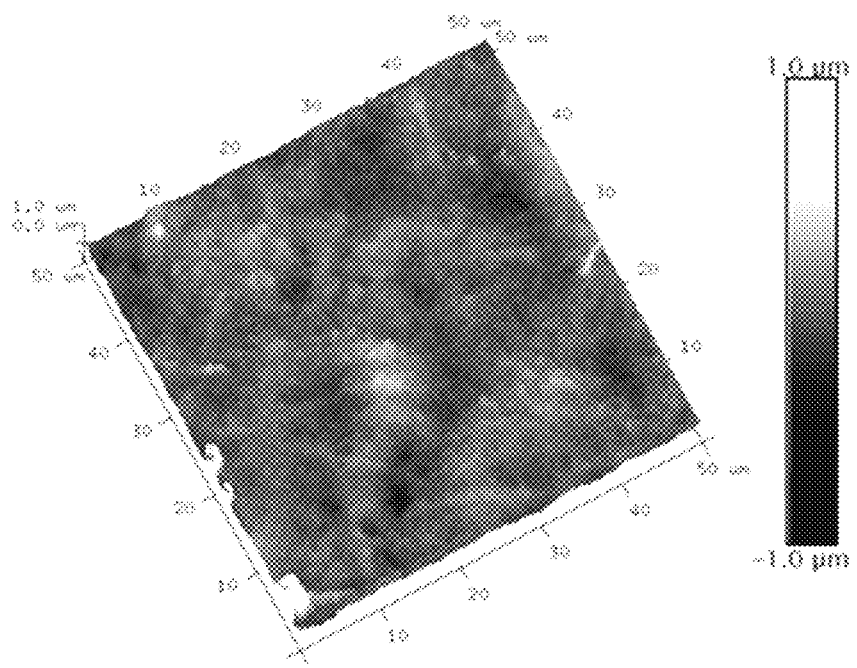
FIG. 1B is an AFM image of a surface of an anode active material layer included in an anode layer prepared in Example 2.

FIG. 1B is an image of the surface of the anode active material layer planarized by the flat press prepared in Example 2.

Figure 1C:
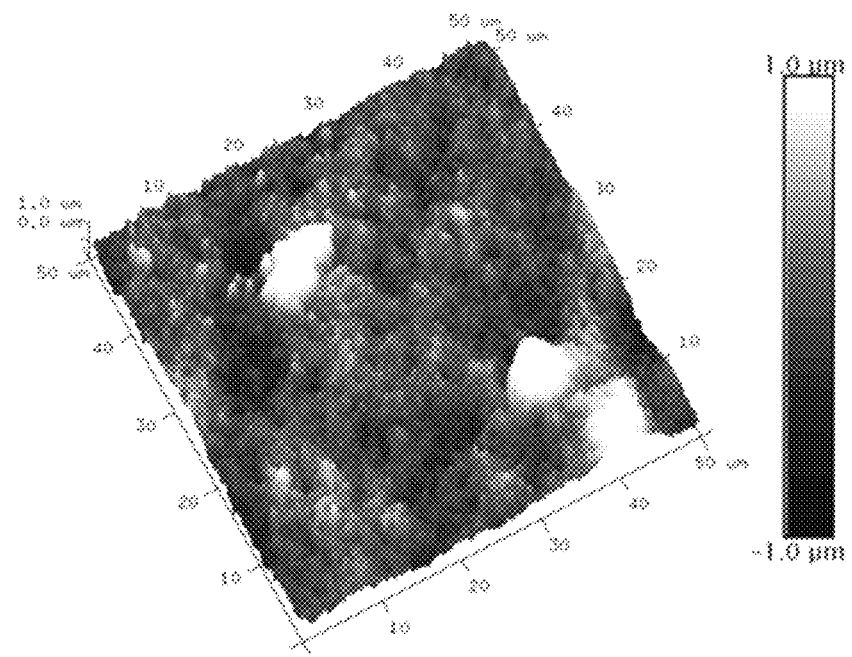
FIG. 1C is an AFM image of a surface of an anode active material layer included in an anode layer prepared in Comparative Example 1.

FIG. 1C is an image of the surface of the anode active material layer prepared in Comparative Example 1 without pressing.

TABLE 1

|  | $R_q$ [µm] | $R_a$ [µm] | $R_{max}$ [µm] |
|---|---|---|---|
| Comparative Example 1 | 0.2400 | 0.1700 | 4.5320 |
| Example 1 | 0.0684 | 0.0528 | 0.9965 |
| Example 2 | 0.1620 | 0.0966 | 3.0093 |

As shown in Table 1, the surface of the anode active material layer included in the anode layer prepared in Comparative Example 1 had $R_{max}$ of more than 3.5 µm, $R_a$ of more than 0.15 µm, and $R_q$ of more than 0.2 µm.

On the other hand, the surface of the anode active material layer included in the anode layer prepared in Examples 1 and 2 had decreased surface roughness.

Evaluation Example 2: Charge and Discharge Test

Charge and discharge characteristics of the all-solid secondary batteries prepared in Examples 1 to 5 and Comparative Examples 1 to 4 were evaluated by the following charge and discharge test. The charge and discharge test was performed by putting the all-solid secondary battery in a thermostat at 60° C.

A first cycle was charged for 12.5 hours at a constant current of 0.6 mA/cm² until a battery voltage reached 3.9 V to 4.25 V. Then, the discharge was performed for 12.5 hours at a constant current of 0.6 mA/cm² until the battery voltage reached 2.5 V.

In a second cycle and following cycles, the charging and discharging were performed in the same conditions as those of the first cycle.

In the all-solid secondary battery prepared in Comparative Example 1, a short circuit occurred at a battery voltage of about 3.7 V in a charging process of the first cycle and the charging was not performed after the short circuit, and thus the battery voltage no longer increased.

In the all-solid secondary battery of Example 1, the first cycle and the second cycle were normally performed. The all-solid secondary battery was charged until 4.25 V at the second cycle.

In the all-solid secondary battery of Example 2, the first cycle was normally performed. The all-solid secondary battery was charged until 3.95 V at the first cycle.

In the all-solid secondary batteries of Examples 3 to 5, the first cycle and the second cycle were normally performed.

In the all-solid secondary batteries of Comparative Examples 2 to 4, the short circuit occurred in the charging process of the first cycle or the discharging process of the first cycle.

In the all-solid secondary batteries of Examples 1, 2, 4, and 5, it was confirmed that after the charging at the first cycle was completed, a lithium metal layer corresponding to the second anode active material layer was formed between the first anode active material layer and the anode current collector by measuring SEM images for cross sections of these batteries.

In the all-solid secondary battery of Example 3, it was confirmed that after the charging at the first cycle was completed, a lithium metal layer corresponding to the second anode active material layer was formed between the first anode active material layer and the Sn thin film layer by measuring an SEM image for cross section of the battery.

Evaluation Example 3: Evaluation of Cross-Sectional Shape

Figure 2A:
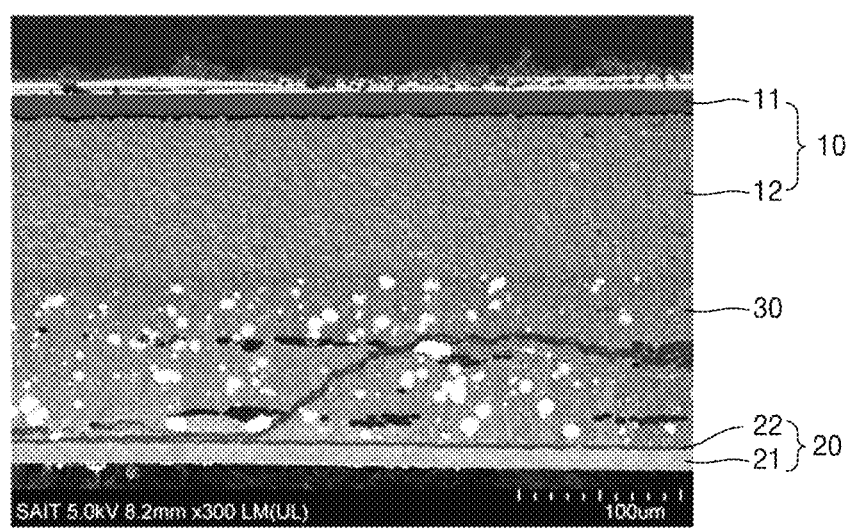
FIG. 2A is a scanning electron microscope (SEM) image of a cross-section of an all-solid secondary battery prepared in Example 1.
Figure 2B:
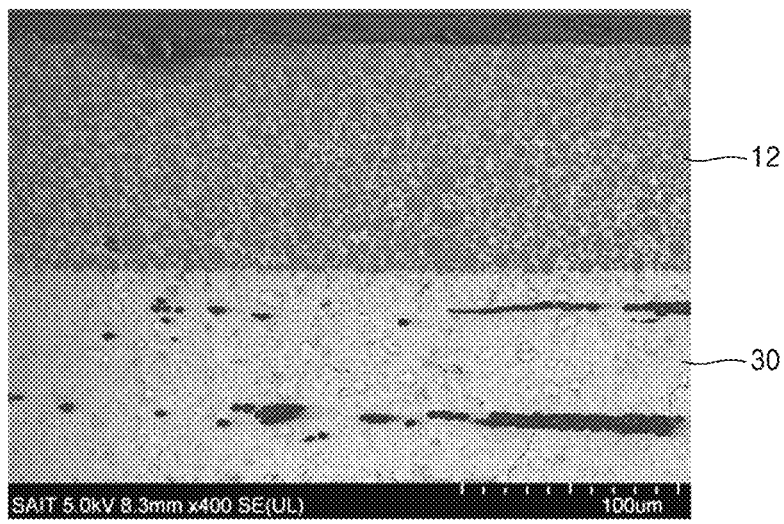
FIG. 2B is an SEM image of a cross-section of an all-solid secondary battery prepared in Example 2.
Figure 2C:
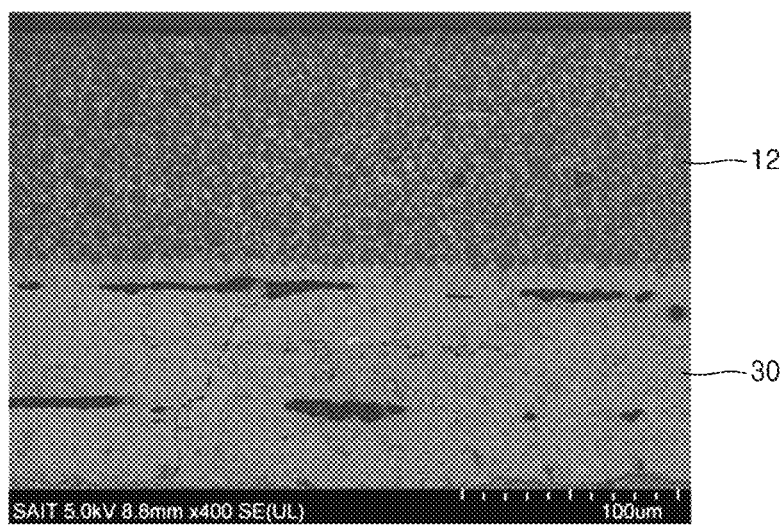
FIG. 2C is an SEM image of a cross-section of an all-solid secondary battery prepared in Comparative Example 1.

SEM images of the cross sections of the all-solid secondary batteries of Examples 1 and 2 and Comparative Example 2 in which charging and discharging were performed in Evaluation Example 1 were measured and the results were shown in FIGS. 2A to 2C.

As shown in FIG. 2A, in the all-solid secondary battery of Example 1, cracks penetrated in a thickness direction of the solid electrolyte layer were not generated even after the second cycle was completed. Some of cracks formed in a longitudinal direction of the solid electrolyte layer were generated.

As shown in FIG. 2B, in the all-solid secondary battery of Example 1, cracks penetrated in a thickness direction of the solid electrolyte layer were partially generated even after the first cycle was completed.

As shown in FIG. 2C, in the all-solid secondary battery of Comparative Example 1, a short circuit occurred before the charging at the first cycle was completed and cracks penetrated in a thickness direction of the solid electrolyte layer were clearly generated.

Accordingly, the all-solid secondary battery of Comparative Example 1 had the increased surface roughness of the first anode active material layer compared with those of the all-solid secondary batteries of Examples 1 and 2, and thus the cracks of the solid electrolyte layer were increased, and as a result, the short circuit occurred.

As described above, the all-solid secondary battery according to the present embodiment may be applied to various portable devices, vehicles, and the like.

According to an aspect, it is possible to provide an all-solid secondary battery capable of preventing a short circuit and having good cycle characteristics.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope of the disclosure as defined by the following claims.

What is claimed is:

1. An all-solid secondary battery comprising:
an anode layer including a first anode active material layer, wherein the first anode active material layer comprises amorphous carbon;
a cathode layer including a cathode active material layer;
a solid electrolyte layer between the anode layer and the cathode layer; and
an anode current collector on the anode layer and opposite the solid electrolyte layer; and
a second anode active material layer between the anode current collector and the first anode active material layer,
wherein the first anode active material layer includes an anode active material and a binder,
wherein the anode active material includes a mixture of first particles including the amorphous carbon and second particles including a metal or metalloid, and the amount of the second particles is about 8 weight percent to about 60 weight percent, with respect to a total weight of the mixture,
wherein the second anode active material layer is a metal layer including lithium or a lithium alloy,
wherein the solid electrolyte layer comprises a sulfide solid electrolyte, wherein a maximum roughness depth Rmax of a surface of the first anode active material layer is less than 1.5 micrometers.

2. The all-solid secondary battery of claim 1, wherein a mean roughness Ra of a surface of the first anode active material layer is about 0.15 micrometers or less.

3. The all-solid secondary battery of claim 1, wherein a root mean square roughness Rq of the surface of the first anode active material layer is about 0.2 micrometers or less.

4. The all-solid secondary battery of claim 1, wherein a thickness of the first anode active material layer is about 50% or less of a thickness of the cathode active material layer, and the thickness of the first anode active material layer is about 1 micrometers to about 20 micrometers.

5. The all-solid secondary battery of claim 1, wherein the anode active material has a particle shape and an average particle size of the anode active material is 4 micrometers or less.

6. The all-solid secondary battery of claim 1, further comprising a metal or metalloid anode active material comprising at least one of gold, platinum, palladium, silicon, silver, aluminum, bismuth, tin, and zinc.

7. The all-solid secondary battery of claim 1, further comprising:
a film including an element capable of forming an alloy with lithium on the anode current collector, wherein the film is between the anode current collector and the first anode active material layer.

8. The all-solid secondary battery of claim 7, wherein a thickness of the film is about 1 nanometer to about 800 nanometers.

9. The all-solid secondary battery of claim 1, wherein the anode current collector, the first anode active material layer, and an area therebetween are a Li-free area not including lithium.

10. The all-solid secondary battery of claim 9, wherein the Li-free area does not include lithium in an initial state of the all-solid secondary battery, or in a state after discharging the all-solid secondary battery.

11. The all-solid secondary battery of claim 1, wherein the sulfide solid electrolyte includes at least one of $Li_2S$—$P_2S_5$, $Li_2S$—$P_2S_5$—LiX wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ wherein m and n are positive numbers, and Z is one of Ge, Zn or Ga, $Li_2S$—$GeS_2$, $Li_2S$—$SiS_2$—$Li_3PO_4$, $Li_2S$—$SiS_2$—$Li_pMO_q$ wherein p and q are positive numbers, and M is one of P, Si, Ge, B, Al, Ga, and In, $Li_{7-x}PS_{6-x}Cl_x$ wherein $0≤x≤2$, $Li_{7-x}PS_{6-x}Br_x$ wherein $0≤x≤2$, and $Li_{7-x}PS_{6-x}I_x$ wherein $0≤x≤2$.

12. The all-solid secondary battery of claim 1, wherein the sulfide solid electrolyte is an argyrodite-type compound including at least one of $Li_6PS_5Cl$, $Li_6PS_5Br$, and $Li_6PS_5I$.

13. A method of preparing an all-solid secondary battery, the method comprising:
preparing a first laminate by placing an anode active material layer on an anode current collector; and
preparing an anode layer by pressing the first laminate,
preparing a second laminate by placing a solid electrolyte layer on a cathode layer;
preparing a third laminate by placing the anode layer on the second laminate such that the solid electrolyte layer and the anode active material layer contact each other; and
pressing the third laminate to prepare the all-solid secondary battery of claim 1.

14. The method of claim 13, wherein the pressing is roll pressing or flat pressing.

15. The method of claim 14, wherein the pressing is performed at about 20° C. to about 90° C.

16. The method of claim 13, wherein a maximum roughness depth $R_{max}$ of a surface of the anode active material layer included in the anode layer is less than 1.5 micrometers.

17. The all-solid secondary battery of claim 1, wherein the maximum roughness depth $R_{max}$ of the surface of the first anode active material layer is about 0.001 to about 1 micrometer.

* * * * *